(12) United States Patent
Yoon

(10) Patent No.: US 6,278,934 B1
(45) Date of Patent: Aug. 21, 2001

(54) SYSTEM AND METHOD FOR DETECTING ENGINE MISFIRES USING OPTIMAL PHASE DELAY ANGLE

(75) Inventor: Hyoung-Jin Yoon, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/469,952

(22) Filed: Dec. 21, 1999

(30) Foreign Application Priority Data

Apr. 13, 1999 (KR) .............................. 1999-12888

(51) Int. Cl.$^7$ .................................................. G01M 15/00
(52) U.S. Cl. ........................ 701/111; 701/114; 73/116
(58) Field of Search ........................ 123/406.13, 406.14, 123/406.27; 701/111, 114; 73/116, 117.3

(56) References Cited

U.S. PATENT DOCUMENTS 5,359,518 * 10/1994 Wimmer .............................. 701/111

* cited by examiner

Primary Examiner—Andrew M. Dolinar
(74) Attorney, Agent, or Firm—Christie, Parker & Hale, LLP

(57) ABSTRACT

The present invention is a system and method for detecting engine misfires, but which prevents false detections or non-detection of misfires that occur as a function of driving status parameters such as the rpm of the engine or load. When the output of the engine changes due to misfires while a time duration for each predetermined rotation angle of the crank shaft is continuously measured, a time variation ratio can then be used as a reference value for detecting the misfires. In the event of a variation of engine torque caused by misfires results in an unreliable detection of the variation ratio of the time duration for each rotation angle of the crank shaft because system mechanical characteristics or inertia associated with a driving mode, an optimal phase delay angle is established for each driving mode, and a time duration for a predetermined rotation angle of the crank shaft is used as a correction so as to detect the misfires of the engine, thereby improving reliability of the detection of the engine misfires.

8 Claims, 7 Drawing Sheets

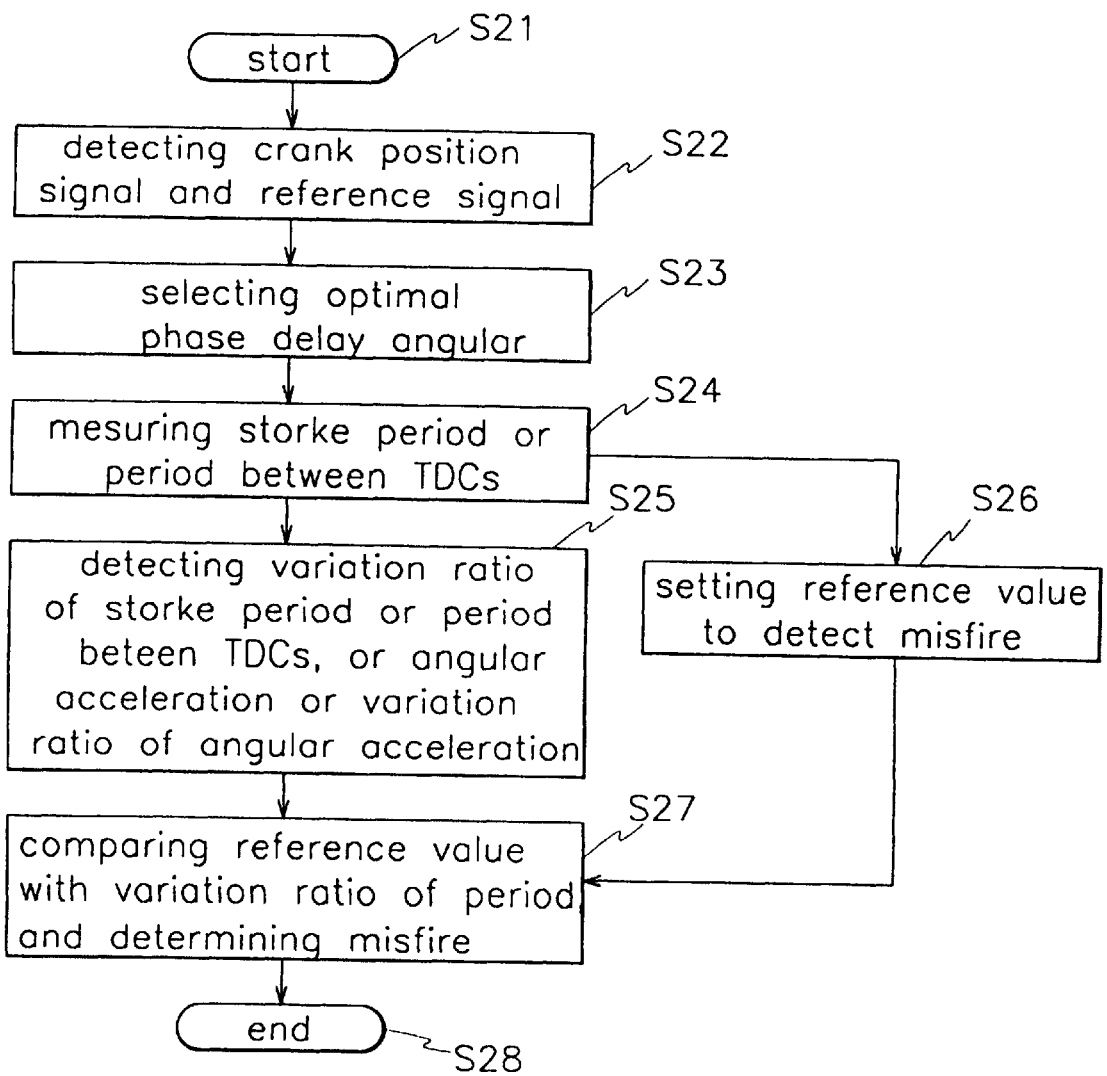

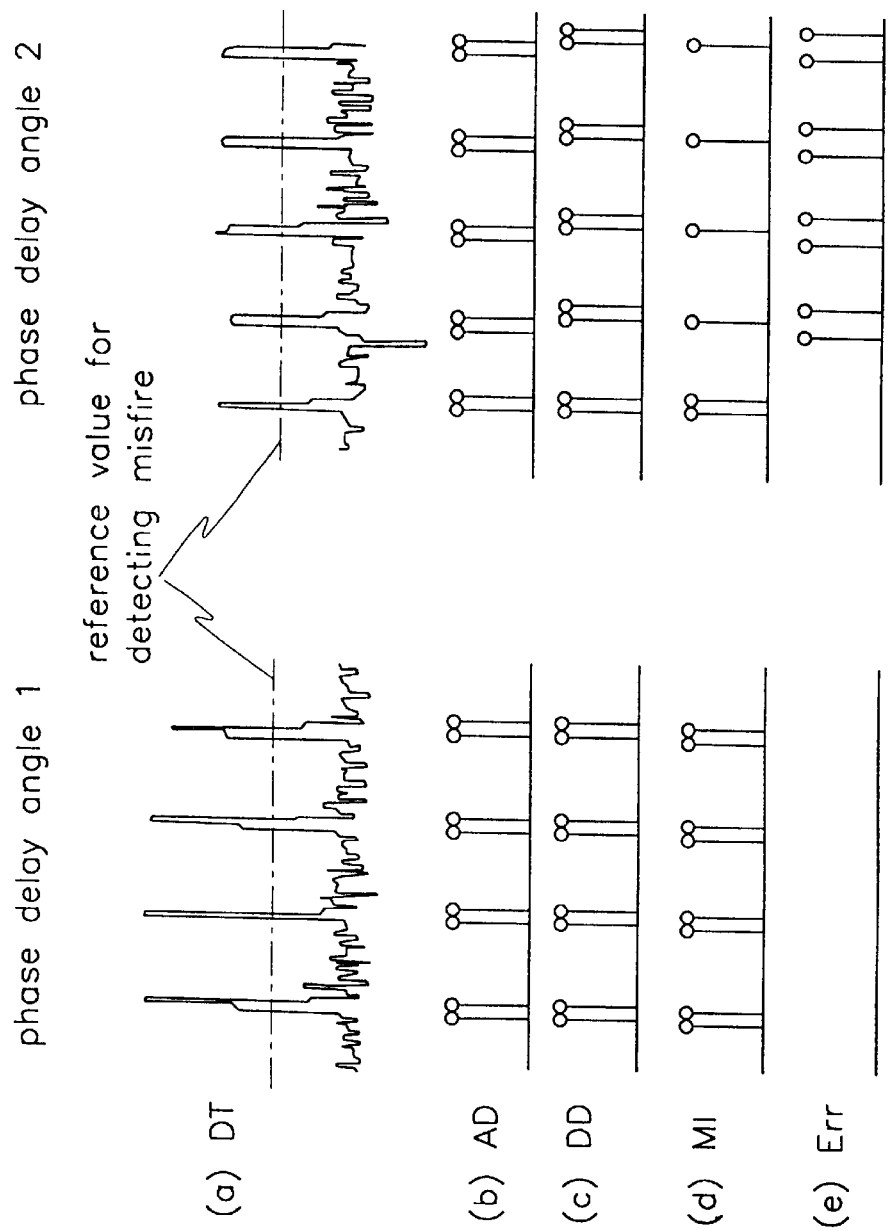

SYSTEM AND METHOD FOR DETECTING ENGINE MISFIRES USING OPTIMAL PHASE DELAY ANGLE

BACKGROUND OF THE INVENTION (a) Field of the Invention

The present invention relates to a system and method for detecting with an electric control unit (ECU) a misfire occurring in an engine cylinder. More specifically, the present invention relates to a system and method for detecting a misfire occurring in an engine according to drive mode status parameters, such as engine revolutions per minute (rpm) or load.

(b) Description of the Related Art

To prevent air pollution caused by the development of the automotive industry, exhaust gas emissions have been continuously restricted, and accordingly, techniques for electronically controlling engines have been developed.

Furthermore, as recent techniques for electronically controlling engines require the adoption of the On-Board Diagnosis 2 (OBD 2) standard that obligates a computer installed in a car to collect information needed to detect malfunctions and to generate alarms, systems and techniques to detect an increase of exhausted gas caused by a misfire and possibility the damage of catalysts are now required. Accordingly, a system and method for detecting an occurrence of a misfire and the cylinder at which the misfire occurred, and for the restoration of the proper operating status of the engine is now needed.

In a conventional system and method for detecting an engine misfire, when a piston moves back and forth between the top dead center (TDC) and bottom dead center (BDC) positions in a cylinder, the system measures the time required to achieve each predetermined rotation angle of a crank shaft. In this process, when an engine misfire occurs, the above noted time increases because of a decrease of an engine torque. At this time, the ECU compares a time variation ratio of this measured time with a predetermined reference value, and when the time variation ratio is greater than a predetermined reference value, a misfire is deemed to have occurred.

However, in the conventional system and method, a decrease of torque caused by an engine misfire does not immediately appear because of the mechanical characteristics of the system or inertia associated with various drive mode status parameters such as engine rpm or load. Therefore, the actual time variation ratio caused by the occurrence of the engine misfire is somewhat different from the time variation ratio detected at the ECU, and thereby, the generation of false detections or the failure to detect real engine misfires result. Especially during high-speed rotations of the engine, with a great amount of inertia at work, the changes of the torque caused by engine misfires do not quickly appear, and therefore, the possibility of failing to detect a misfire increases.

SUMMARY OF THE INVENTION

It is an object of the present invention to provide a system and method for detecting engine misfires that prevents false detection or non-detection of an engine misfire associated with drive mode status parameters such as engine rpm or load.

In one aspect of the present invention, to compensate for incorrect detections of variation ratios of the time durations for each predetermined rotation angle of the crank shaft in the event of changes of torque caused by engine misfires associated with particular driving modes, optimal phase delay angles are set up for each driving mode, and the time is then compensated for the correct measurement of the time variation ratio and the detection of misfires.

In more detail, a magnetic pickup and a switching unit generate a crank position signal using a variation of a distance from the magnetic pickup between a tooth and the bottom of the space between the teeth on a crank position target wheel connected to the cam shaft. An ECU generates a reference signal through a phase sensor to set up an optimal phase delay angle according to a driving mode, and computes the variation ratio of a time duration for each predetermined rotation angle of the crank shaft after a predetermined optimal phase delay angle has been established according to a driving mode with consideration for this reference signal so that a misfire of the engine can be detected.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 (*b*) is a waveform of a reference signal and crank position signal with which an optimal phase delay angle is set;

FIG. 2 is a flow chart of a method for detecting an engine misfire according to a preferred embodiment of the present invention;

FIG. 3 is a chart illustrating a method to set the optimal phase delay angle using a performance index;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1A:
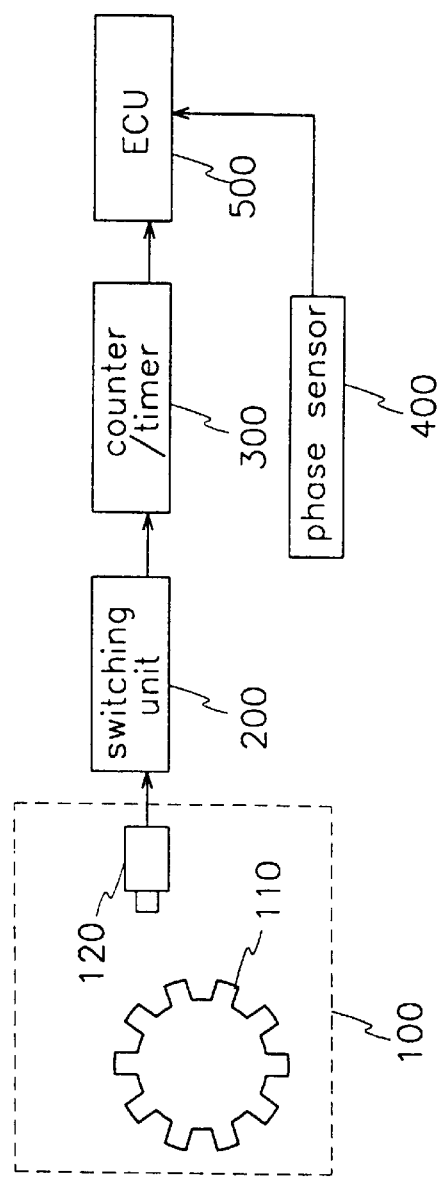
FIG. 1 (*a*) is a block diagram of an engine misfire detecting system according to a preferred embodiment of the present invention.
Figure 1B:
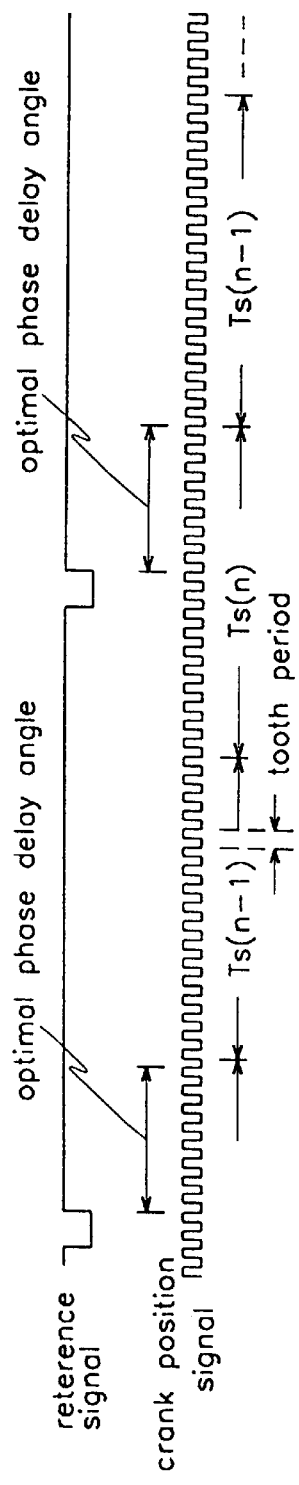

FIG. 1 (*a*) is a block diagram of an engine misfire detecting system. The system comprises a crank position sensor 100 including a crank position target wheel 110 and a magnetic pickup 120, a switching unit 200, a counter/timer 300, a phase sensor 400, and an ECU 500.

In the crank position sensor 100, when the crank position target wheel 110 that is connected to the cam shaft rotates, the magnetic pickup 120 detects variations in the magnetic field lines caused by the variation of the distance from the magnetic pickup 120 between the teeth and the bottom surface of the teeth spaces of the crank position target wheel 110, and outputs analog signals.

The switching unit 200 receives analog signals provided from the crank position sensor 100, and converts the signals into digital signals, such as the crank position signals represented in FIG. 1 (*b*). The counter/timer 300 receives the crank position signals and determines a tooth period of the crank position signals. At this time, a tooth period is defined as a time from when a tooth and a tooth space bottom of the crank position target wheel 110 pass the magnetic pickup 120 to a time when the next tooth passes the magnetic pickup 120.

When the phase sensor 400 inputs a reference signal to the ECU 500 concurrently with a tooth period provided from the counter/timer 300, the ECU 500 sets up the optimal phase delay angle using the two signals to find the variation ratio of stroke period (or a period between the TDCs), and compares the variation ratio of the periods to a predetermined reference value. When the variation ratio of the periods exceeds a predetermined reference value, a misfire is deemed to have occurred. At this time, a stroke period represents a time for an engine to perform one stroke, and the period between the TDCs represents a time after a piston reaches the TDC of a cylinder to perform a power stroke in a cylinder and until a piston reaches TDC again to perform the next power stroke.

FIG. 2 is a flow chart of a method for detecting an engine misfire according to a preferred embodiment of the present invention.

When a misfire detection process starts in step s21, the crank position signal and reference signal are detected using the misfire detecting system in step s22. When the ECU 500 selects the optimal phase delay angle in step s23, stroke period or period between TDCs are measured in step s24. A variation ratio of each stroke period or the period between the TDCs, or an angular acceleration, or a variation ratio of the angular acceleration are measured in step s25, and a reference value to detect a misfire is set so as to be compared in step s26 with the variation ratio. When a comparison result of the reference value and the variation ratio of the period between TDCs indicates a misfire in step s27, the misfire detecting process is completed in step s28.

Or in other words, after a misfire detecting process starts in step s21, the reference signal as shown in FIG. 1 (*b*) is detected in step s22 through the crank position sensor 100, switching unit 200, counter/timer 300, and phase sensor 400.

The ECU 500 selects an optimal phase delay angle using the crank position signal and reference signal detected in step s22. When a misfire occurs in the engine cylinder, since a variation of the torque caused by the misfire is not promptly transferred to the crank position target wheel 110 because of inertial or other mechanical characteristics, the angle at which the crank position target wheel 110 rotates before this wheel 110 is affected by the misfire becomes the optimal phase angle.

FIG. 3 represents a method to set the optimal phase delay angle using a performance index. A rotation period variation ratio (DT) in FIG. 3 (*a*) is a variation ratio of the computed rotation period, given two different phase delay angles 1 and 2.

Actual detection (AD) signals of FIG. 3 (*b*) indicate the positions where the DT signal of FIG. 3 (*a*) exceeds a predetermined threshold value that indicates a misfire.

Desired detection (DD) signals of FIG. 3 (*c*) indicate positions where actual misfires occurred.

Matching index (MI) signals of FIG. 3 (*d*) are defined for the DD and DT signals so as to have a value of one at identical positions. The Ml signals are obtained by an inner product of the DT and DD signals.

Error index (Err) signals of FIG. 3 (*e*) are defined to have a value of one when the DD and AD signals are not identical. The Err signals are obtained by a logical XOR operation. That is, when the DD signals is one and the AD is zero, or the DD signal is zero and the AD is one, the Err signal indicates one.

Since FIGS. 3 (*d*) and (*e*) indicate whether the position where the misfire occurred corresponds to the position that is determined as a misfire, FIGS. 3 (*d*) and (*e*) can be used as a performance index relating to the detection of the misfire. Therefore, the phase delay angle can be set with reference to a maximum number of Ml signals that are equal to one or a minimum number of Err signals that are equal to one, and accordingly, in FIG. 3, the phase delay angle 1 can be established as the optimal phase delay angle.

To set up the optimal phase delay angle in the ECU 500, experimental results obtained from various driving modes are stored in the ECU 500, and the angle can be set for each driving mode, or automatically corrected by a means for learning the optimum angle.

When the setup of the optimal phase angle is finished in step s23, stroke period or period between TDCs (i.e., time spent for each crank shaft rotation of a predetermined angle) are measured in step s24. At this time, the stroke period indicates a time for one stroke in a four strokes engine, and the period between the TDCs is, for example, a time from which a cylinder performs a power stroke to the time at which a next cylinder performs another power stroke when an engine with four cylinders performs power strokes in order of the first, third, fourth, and second cylinders. In an engine with four cylinders, four TDC periods occur per every one cycle.

The stroke period, or period between TDCs, is the time spent for the crank shaft to rotate by 180°. When a cylinder finishes four strokes, the crank shaft has rotated twice, and therefore, when the cylinder finishes one stroke, the crank shaft has rotated one half turn. Also, when all the cylinders in a four-cylinder engine perform expansion strokes caused by fuel combustion, the crank shaft rotates twice, and therefore, during a period between TDCs, the crank shaft rotates by one half. Therefore, since a rotation ratio of the crank shaft versus the cam shaft is 2:1, the crank position target wheel 11 connected to the cam shaft rotates as much as 90° for each stroke period (or period between TDCs. Additionally, when the numbers of the teeth of the crank position target wheel 11 is t, the wheel rotates as many as t/4 times.

Referring to FIG. 1 (*b*), since the number of HIGH values of the crank position signal is the number of the teeth of the crank position target wheel 11, in order to find the stroke period, or period Ts, between the TDCs, the teeth (that is, the number of the HIGH values of the crank position signal) are counted up to a value equal to t/4, and the summation of the HIGH values of the teeth during each period is found. Accordingly, after a delay by as much as the numbers of the HIGH values of the crank position signal corresponding to the optimal phase delay angle, the stroke period or period between the TDCs is then found.

After this, the variation ratio of each stroke period, period of the TDCs, or angular acceleration, or variation ratio of the angular acceleration are measured in step s25, and a reference value for the detection of a misfire is set in step s26.

When a misfire occurs in the engine cylinder, the stroke period or the period between the TDCs is changed because of a decrease of the torque of the engine, and there is variations of the stroke period or the period between the TDCs, or angular acceleration, or variation of the angular acceleration. Therefore, the ECU 500 utilizes a variation ratio of the rotation cycle of the crank shaft to detect the misfire. At this time, one of the values selected from the variations of the stroke period or the period between the TDCs, or the angular acceleration or the variation of the angular acceleration is selected, and the selected value is compared with a predetermined reference value for detecting a misfire, and thereby, the misfire is detected.

The variations of the stroke period or the period between the TDCs can be obtained using Equation 1:

$$\Delta T = \frac{T_s(n) + T_s(n-1)}{2} \qquad \text{Equation 1}$$

where, Ts(n) is an $n^{th}$ stroke period or $n^{th}$ period between the TDCs.

Since the angular acceleration or the variation of the angular acceleration is the variation of the angular velocity, the angular velocity is defined as follows:

$$\omega = \frac{\pi/2}{T_s} \qquad \text{Equation 2}$$

where, $\omega$ is the angular velocity, and Ts is the stroke period or the period between the TDCs.

Therefore, the angular acceleration becomes as follows:

$$\frac{d\omega}{dt} \cong \frac{\Delta\omega}{\Delta Ts} \qquad \text{Equation 3}$$

$$= \frac{\left(\frac{\pi}{2Ts(n)} - \frac{\pi}{2Ts(n-1)}\right)}{\frac{Ts(n) + Ts(n-1)}{2}}$$

$$= \frac{\pi(Ts(n-1) - Ts(n))}{Ts(n-1)Ts(n)(Ts(n-1) + Ts(n))}$$

where, $\Delta \omega$ is variation of the angular velocity, and $\Delta$ Ts is a variation of the stroke period or the period between the TDCs.

The variation of the angular acceleration is as follows:

$$\frac{\frac{d\omega}{dt}}{\omega} \cong \frac{\frac{\Delta\omega}{\Delta Ts}}{\omega} \qquad \text{Equation 4}$$

$$= \frac{[Ts(n-1) - Ts(n)]}{2Ts(n-1) \cdot [Ts(n-1) + Ts(n)]}$$

Therefore, by comparing the reference value for detecting a misfire with the detected angular acceleration or variation of the angular acceleration, a misfire is detected.

However, if the reference value is too high, the misfire detecting system becomes very sensitive to the variation ratio of the instantaneous rotation and misfires are frequently not detected, and if the reference value is too low, the system cannot correspond to the variation of rotation, and false detections of misfires frequently occur. Therefore, a suitable reference value must be determined in step s26.

In setting the reference value of detecting the misfire, when using the angular acceleration of Equation 3, the reference value is set with $Ts^3$, a value that is of the same degree as that of the denominator of Equation 3, and when using the angular acceleration of Equation 4, the reference value is likewise set with $Ts^2$, and only when using the variation of the stroke period or the variation ratio of the period between TDCs is the reference value set with Ts.

FIGS. 4 through 7 show simulation results for setting the optimal phase delay angle and optimal misfire detecting reference value under various driving conditionals.

Figure 4:
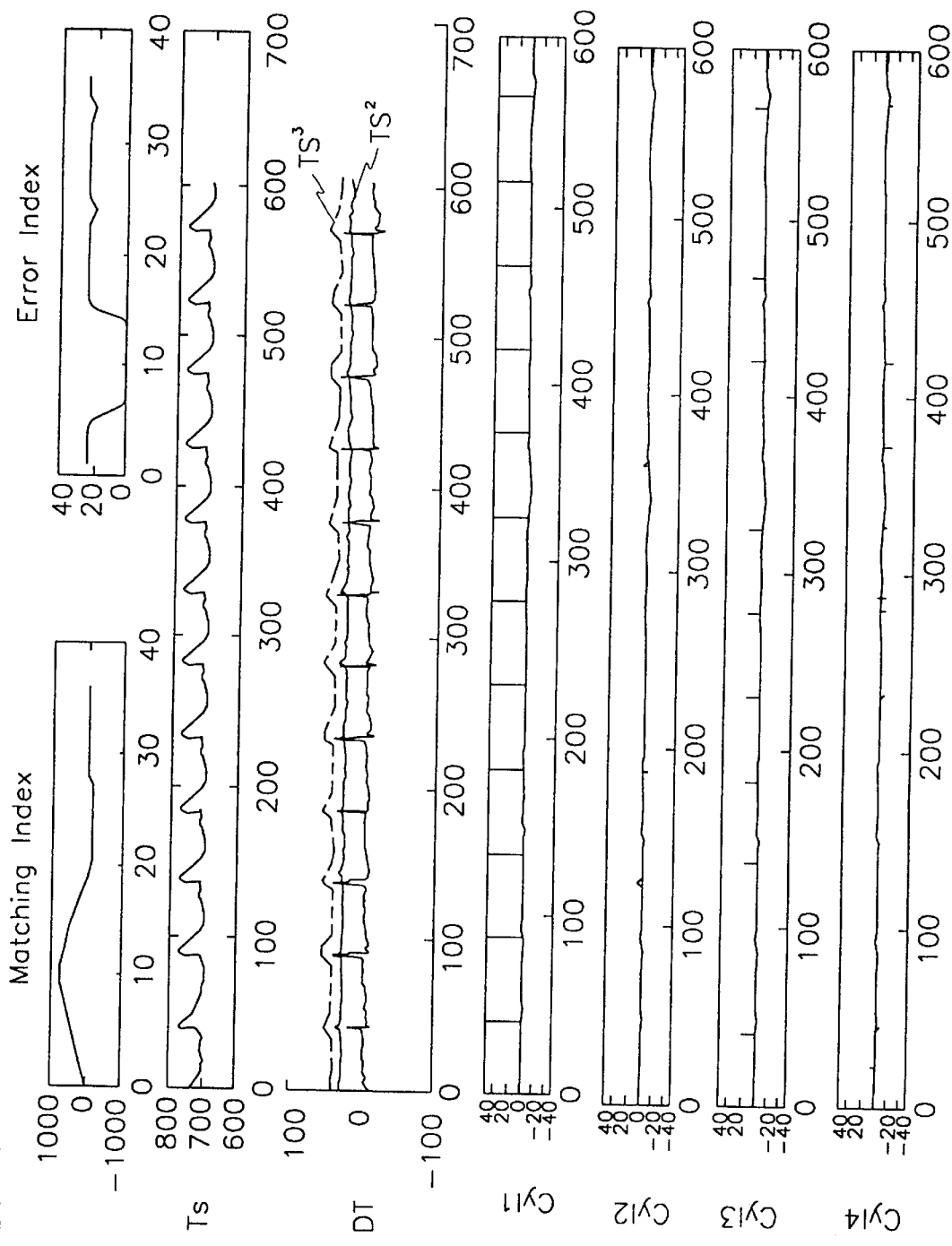
FIG. 4 is a performance index to determine an optimal phase delay angle for a constant speed during a dynamo test.

Referring to FIG. 4, a misfire can be seen to be periodically occurring once each period in the first cylinder during a dynamo test to determine the optimal phase delay angle and the reference value under a constant velocity conditions. The stroke period or the period between the TDCs, and the DT are greatly changed around point at which the misfires occur. At this time, when the Matching Index (MI) or Error Index (Err) signals are found by varying the phase delay angle from zero to forty degrees, the value of '10,' having the maximum number of HIGH values among the MI signals, or having the minimum number of HIGH value among the Err signals, can be set as the optimal phase delay angle in the driving mode under constant velocity conditions.

In the DT graph, it is suitable to set the reference value for detecting the misfire as $Ts^2$, because the reference value $Ts^3$ cannot detect a misfire, while it can be seen that the reference value $Ts^2$ can detect the misfire.

Figure 5:
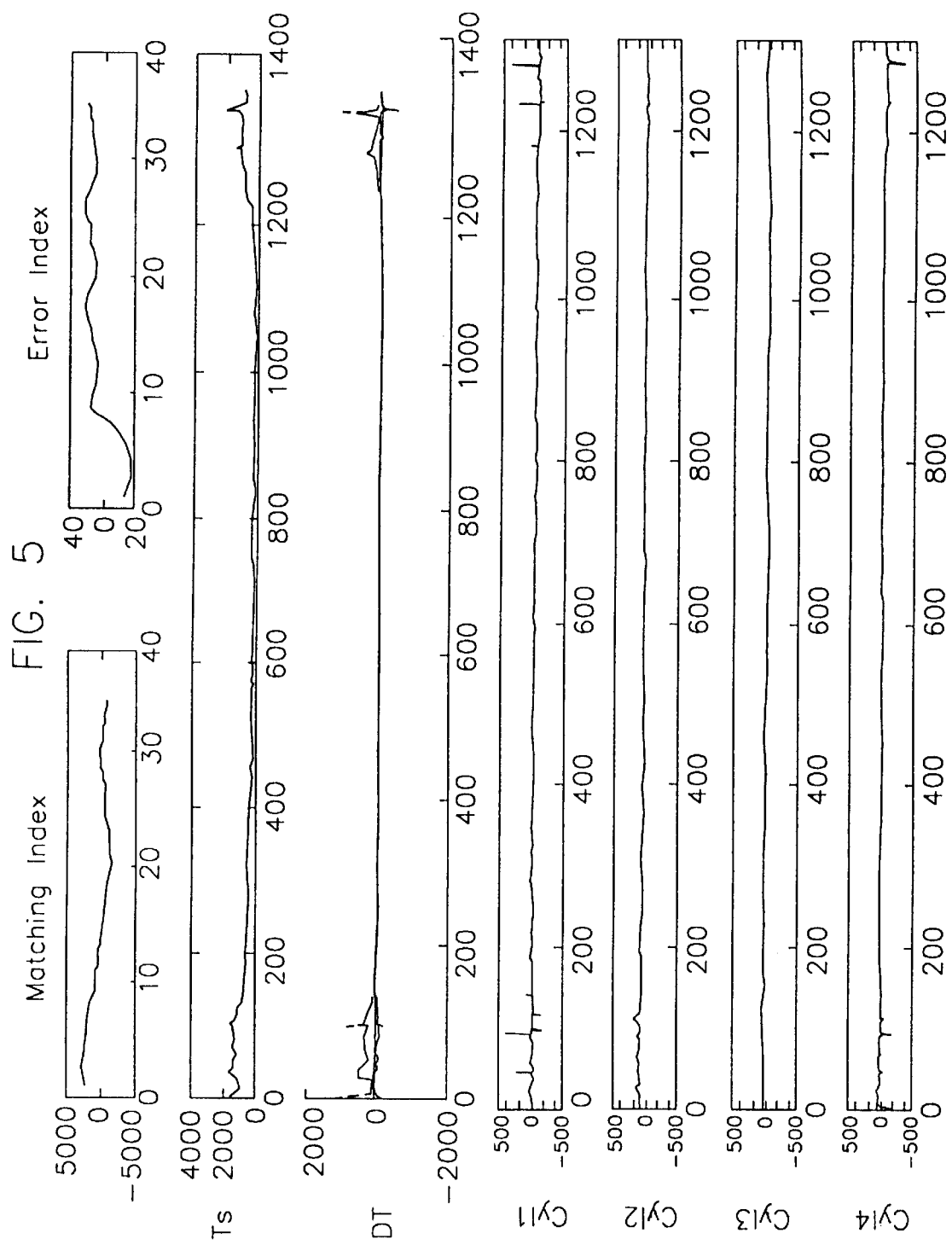
FIG. 5 is a performance index to determine an optimal phase delay angle for a gradual accelerating mode or deceleration mode in a Belgian Road Test.

Referring to FIG. 5, the optimal phase delay angle and the reference value of detecting a misfire is set in a gradual accelerating or decelerating mode in third gear on a Belgian Road Test.

Figure 6:
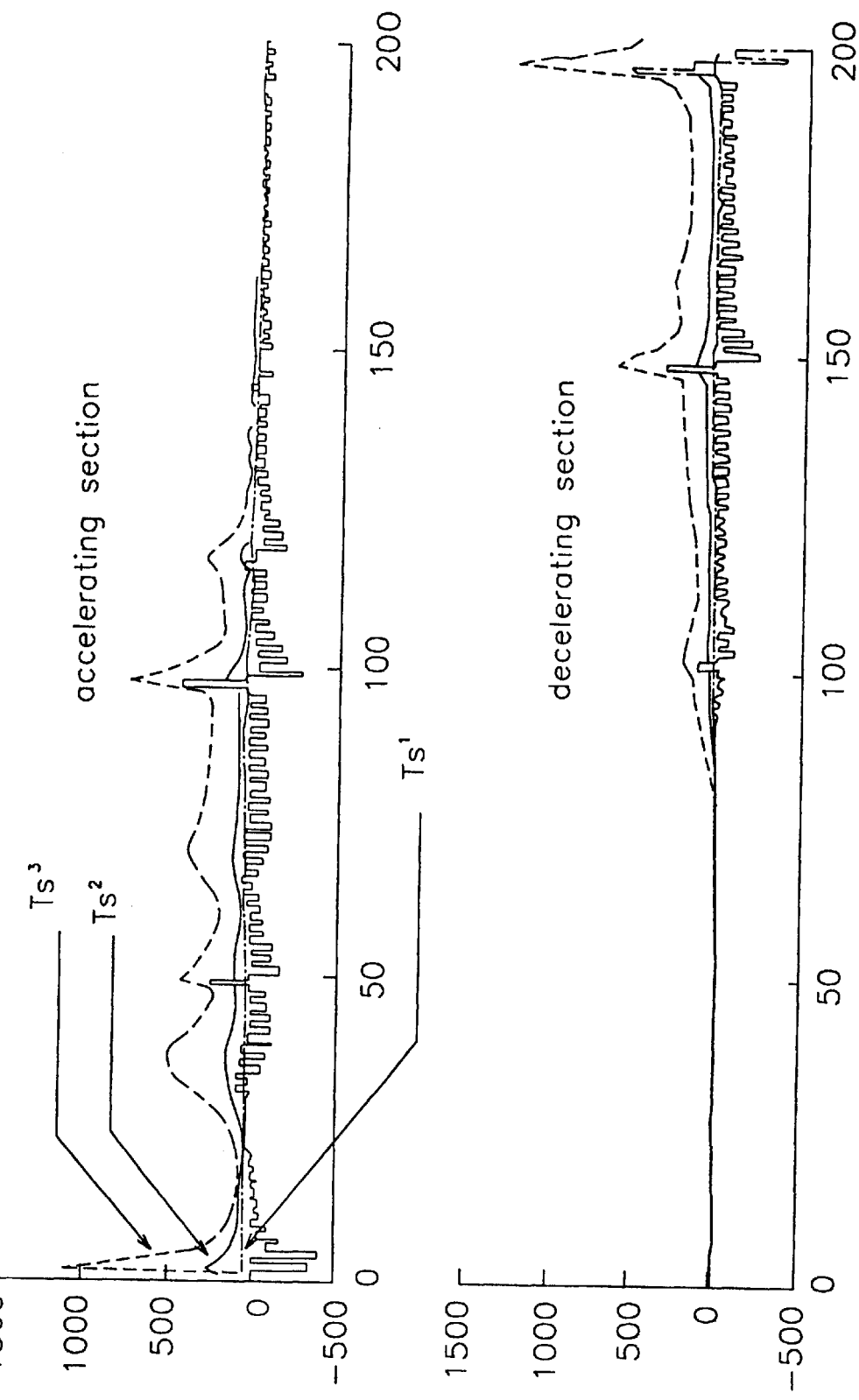
FIG. 6 is an amplified diagram of the variation ratio of rotation period of FIG. 5.

FIG. 6 is an amplified drawing of the DT plot of FIG. 5 showing when the misfire occurs in the first cylinder in the accelerating and decelerating sections of this plot. As can be seen, the DT is greatly varied around the point at which the misfire occurs in the first cylinder.

When the MI or Err signals are found by varying the phase delay angle from zero to 40 degrees, the value of '3' indicating the maximum value of the MI signals, or the value of '4' indicating the minimum value of the Err signals, become the optimal phase delay angle under the driving mode in gradual accelerating or decelerating conditions.

Referring to FIG. 6, in the case where the reference value for detecting a misfire is set as $Ts^3$, the misfire detecting system becomes very sensitive to the variation ratio of the instantaneous rotation and a misfire is frequently not detected. Additionally, if the reference value is set as Ts, the system cannot accommodate a variation of rotation, and false detection of misfires frequently occurs. However, when the reference value is set as $Ts^2$, the misfire can be detected.

Figure 7:
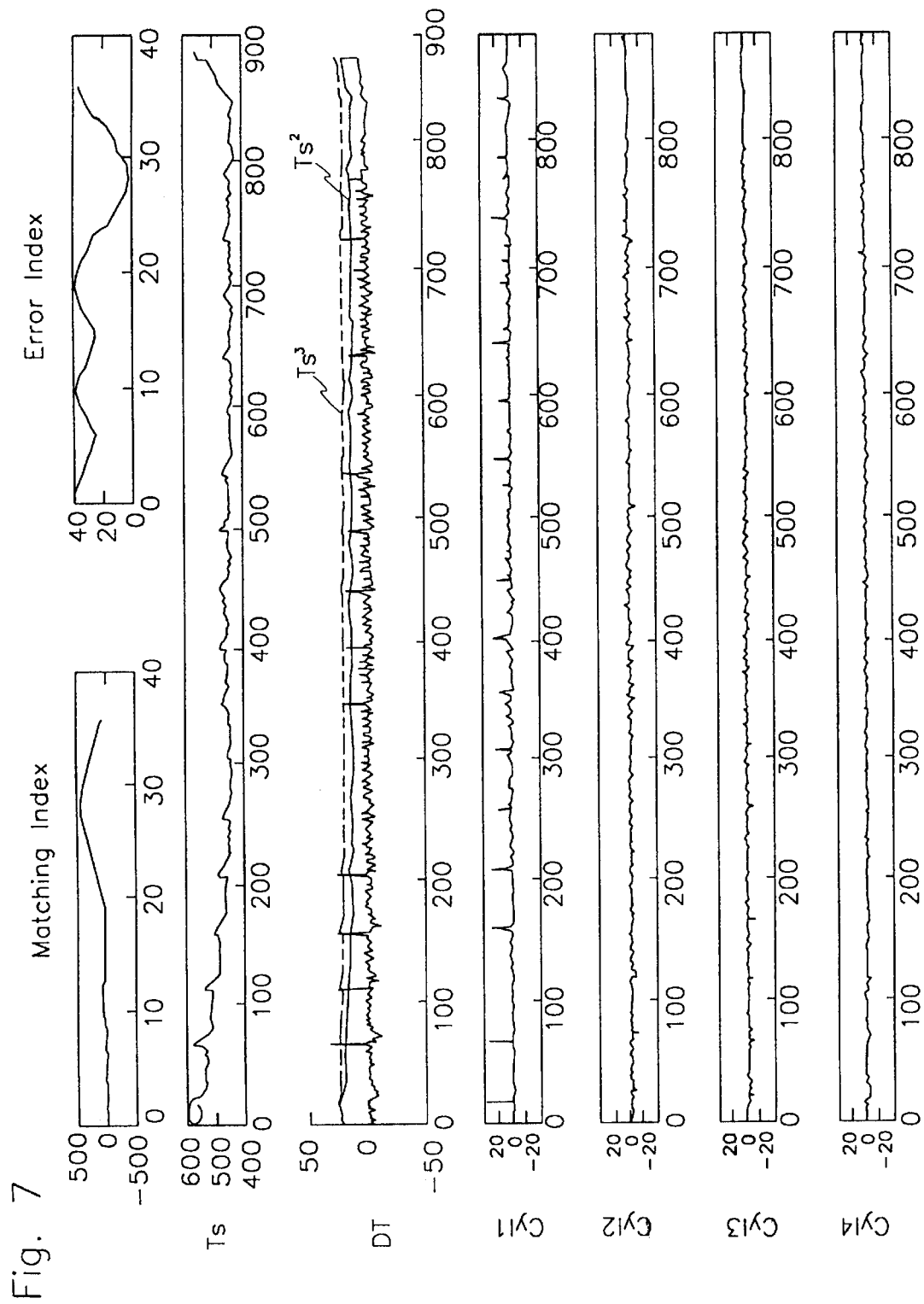
FIG. 7 is a performance index to determine the optimal phase delay angle in the Wash Board Test.

FIG. 7 shows the period between the TDCs, Ts, and variation ratio of rotation period DT when a misfire is generated in the first cylinder while in second gear during a Wash Board Test generating a disturbance to determine the optimal phase delay angle and the reference value.

When a misfire occurs in the first cylinder, the DT and Ts are greatly varied at the point in which the misfire occurred. At this time, when the Ml or Err signals are found by varying the phase delay angle from zero to40 degrees, the value of about '28,' at which the maximum value of the MI signal and the minimum value of the Err signal appear, becomes the optimal phase delay angle in second gear shift when a periodic disturbance is provided.

When the reference value to detect the misfire is set as $Ts^3$ in the DT, a misfire cannot be detected. However, when the value is set as $Ts^2$, misfires can be detected.

As noted above, a suitable reference value for detecting a misfire is $Ts^2$, and the reference value for detecting a misfire that was programmed in the ECU 500 is set as $A \times Ts^2$, where A is a correction constant, and the correction constants are selected according to driving modes. The reference value for detecting misfires is set in step s26.

When the reference value has been set and the stroke period or the variation ratio of the period between the TDCs are found, the reference value is compared with the stroke period or the variation ratio of the period between the TDCs. If a misfire is determined to have occurred in step s27, the process of the detection of a misfire is then completed in step s28.

Additionally, the crank position target wheel can be equipped with holes instead of the teeth, and can also use hole sensors instead of magnetic pickups.

The crank position target wheel can also be connected to the crank shaft, and thereby, a misfire can be determined directly by using the rotation of the crank shaft.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. A method of detecting a misfire of an engine, comprising the steps of:
   detecting a crank position signal and a reference signal through a system for detecting a misfire of an engine;
   selecting an optimal phase delay angle, wherein the optimal phase delay angle is set with a phase delay angle maximizing a matching index signal;
   measuring a stroke period;
   measuring variation of the stroke period;
   setting a reference value for detecting a misfire; and
   comparing the reference value with the variation of the stroke period to determine the occurrence of misfires.

2. A method of detecting a misfire of an engine, comprising the steps of:
   detecting a crank position signal and a reference signal through a system for detecting a misfire of an engine;
   selecting an optimal phase delay angle, wherein the optimal phase delay angle is set with a phase delay angle minimizing an error index signal;
   measuring a stroke period;
   measuring variation of the stroke period;
   setting a reference value for detecting a misfire; and
   comparing the reference value with the variation of the stroke period to determine the occurrence of misfires.

3. The method of claim 1, wherein the stroke period is detected after the optimal phase delay angle is established for a plurality of driving modes with reference to the reference signal output from the phase sensor.

4. The method of claim 1, wherein the reference value for the detecting the misfire is set according to the degree of magnitude of a variation ratio of a time duration for a predetermined rotation angle of the crank shaft.

5. A method of detecting a misfire of an engine, comprising the steps of:
   detecting a crank position signal and a reference signal through a system for detecting a misfire of an engine;
   selecting an optimal phase delay angle;
   measuring a stroke period;
   measuring variation of the stroke period;
   setting a reference value for detecting a misfire, wherein the reference value for detecting the misfire is set according to the degree of magnitude of a denominator of an equation that finds an angular acceleration using the variation ratio of a time duration for a predetermined rotation angle of the crank shaft; and
   comparing the reference value with the variation of the stroke period to determine the occurrence of misfires.

6. A method of detecting a misfire of an engine, comprising the steps of:
   detecting a crank position signal and a reference signal through a system for detecting a misfire of an engine;
   selecting an optimal phase delay angle;
   measuring a stroke period;
   measuring variation of the stroke period;
   setting a reference value for detecting a misfire, wherein the reference value for detecting the misfire is set according to the degree of magnitude of a denominator of an equation that finds a, variation ratio of an angular acceleration using the variation ratio of a time duration for a predetermined rotation angle of the crank shaft; and
   comparing the reference value with the variation of the stroke period to determine the occurrence of misfires.

7. A method of detecting a misfire in each individual cylinder of a multi-cylinder internal combustion engine having a piston in each cylinder connected to a crankshaft via connecting rods, the method comprising the steps of:
   detecting a crank shaft position signal and a reference crank shaft phase signal through a system for detecting misfires of an engine;
   selecting a phase delay angle, the phase delay angle being a function of the crank shaft position signal and the reference crankshaft phase signal;
   selecting an optimal phase delay angle, wherein the optimal phase delay angle is determined by maximizing the phase delay angle with respect to a matching index signal;
   measuring a stroke period for each of the cylinders, the stroke period being derived from the crank shaft position signal and the optimal phase delay angle;
   measuring a variation of the stroke period for each cylinder;
   setting a predetermined reference value for detecting a misfire in each of the cylinders; and
   comparing the reference value with the variation of the stroke period for each of the cylinders to determine the occurrence of a misfire in each of the cylinders.

8. A method of detecting misfires in each individual cylinder of a multi-cylinder internal combustion engine having a piston in each cylinder connected to a crankshaft via connecting rods, the method comprising the steps of:
   detecting a crank shaft position signal and a reference crank shaft phase signal through a system for detecting misfires of an engine;
   selecting a phase delay angle, the phase delay angle being a function of the crank shaft position signal and the reference crankshaft phase signal;
   selecting an optimal phase delay angle, wherein the optimal phase delay angle is determined by minimizing the phase delay angle with respect to an error index signal;
   measuring a stroke period for each of the cylinders, the stroke period being derived from the crank shaft position signal and the optimal phase delay angle;
   measuring a variation of the stroke period for each cylinder;
   setting a predetermined reference value for detecting a misfire in each cylinder; and
   comparing the reference value with the variation of the stroke period for each cylinder to determine the occurrence of misfire in each cylinder.

* * * * *

UNITED STATES PATENT AND TRADEMARK OFFICE
CERTIFICATE OF CORRECTION

PATENT NO.   : 6,278,934 B1
DATED        : August 21, 2001
INVENTOR(S)  : Hyoung-Jin Yoon It is certified that error appears in the above-identified patent and that said Letters Patent is hereby corrected as shown below:

Drawings,
FIG 2, on the title page and Sheet 2, in box S24 replace "mesuring stroke" with -- measuring stroke --, and in box S25 replace "storke" with -- stroke --.

Column 7,
Line 49, before "detecting" delete "the".

Column 8,
Line 12, after "finds a" delete the comma.

Signed and Sealed this

Fourth Day of February, 2003

JAMES E. ROGAN
*Director of the United States Patent and Trademark Office*